No. 639,198. Patented Dec. 12, 1899.
J. S. McDONALD.
PIPE COUPLING.
(Application filed Mar. 6, 1899.)
(No Model.)

Witnesses:
Robert Everett
H. B. Keefer

Inventor:
John S. McDonald,
By James L. Norris
Atty.

UNITED STATES PATENT OFFICE.

JOHN SHEPHERD McDONALD, OF NEW ORLEANS, LOUISIANA.

PIPE-COUPLING.

SPECIFICATION forming part of Letters Patent No. 639,198, dated December 12, 1899.

Application filed March 6, 1899. Serial No. 707,995. (No model.)

*To all whom it may concern:*

Be it known that I, JOHN SHEPHERD MCDONALD, a citizen of the United States, residing at New Orleans, in the parish of Orleans and State of Louisiana, have invented new and useful Improvements in Pipe-Couplings, of which the following is a specification.

My invention has to do with pipe-couplings, the same being particularly designed as a means for connecting a supply-pipe to a hydraulic pressure-cylinder wherein high pressures are employed, which tend to cause leakage between the parts.

The object of the invention is to provide novel, simple, efficient, and durable contrivances for producing a tight joint which will avoid the twisting of the packing ring or washer and the stripping of the screw-threads on the coöperating parts.

The invention will be described in detail in the following specification, and the novel features thereof will be pointed out in the claim.

Figure 1:
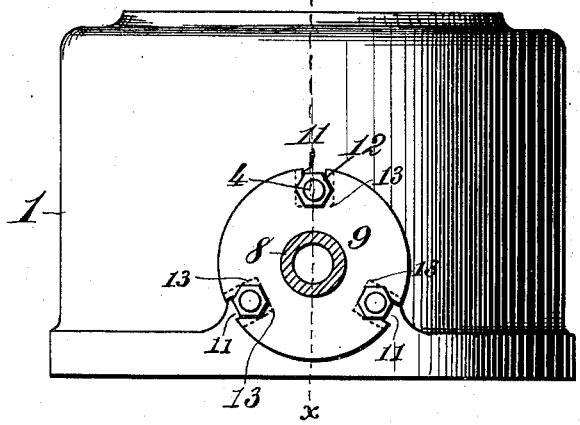
Figure 2:
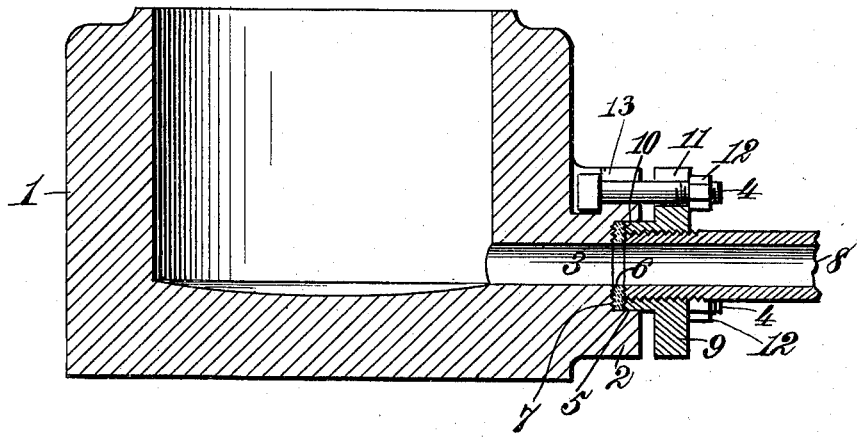

In the drawings, Figure 1 represents an end view of a hydraulic cylinder, and Fig. 2 is a longitudinal section on the line $x$ $x$ of Fig. 1.

Like reference-numerals indicate like parts in both views.

The cylinder 1 may be of any suitable or approved form or construction, except that it is provided with what may be termed a "nozzle" 2 on one side thereof, through which and the side wall of the cylinder is a passage or conduit 3. The nozzle projects laterally from the cylinder, and in its exterior or periphery it is provided with a plurality of radial slots 13, open at their outer ends and constructed to receive the heads and portions of the cylindrical bodies of bolts 4. The nozzle is recessed, as at 5, adjacent to the orifice 3, forming a seat for a packing ring or washer 6. The inner wall of said recess is corrugated or otherwise roughened, as shown at 7, for the purpose of preventing displacement of the said packing-ring. The supply-pipe 8 is externally screw-threaded and has tapped thereon a flange 9, whose outer end lies flush with the outer end of the pipe 8 and is roughened or corrugated, as shown at 10, to correspond with the corrugations 7 in the recess 5. The end of the pipe 8 is also corrugated, as shown. The flange 9 is constructed in its periphery with a plurality of open-end slots 11, in which the threaded end portions of the bolts 4 lie. The outer ends of said bolts 4 are provided with nuts 12, as shown.

As will be seen by reference to Fig. 1 of the drawings, the heads and portions of the cylindrical bodies of the bolts 4 fit within the radially-extending open-end slots 13 13 in the nozzle 2, so that said bolts may be removed at will and readily dropped into place when desired, the outer end of said slots being open and terminating at the periphery of said nozzle.

The operation of my device is as follows: With the parts in the position shown in Fig. 2 in the drawings it is merely necessary in order to form a perfectly tight joint between the pipe 8 and the cylinder 1 to screw up the nuts 12 upon the ends of the bolts 4. This action will force the projecting portions of said pipe and the flange 9 into the recess 5 and into contact with the packing washer or ring 6. The washer or packing-ring, being of leather or other like yielding substance, will be forced into the corrugations 7 and 10 on opposite sides, and a perfect seal will be obtained. During this action it will be observed that no rotary movement of any of the parts except the nuts 12 is necessary, and consequently the twisting of the packing-ring is an impossibility. Furthermore, there is no danger of stripping the threads between the pipe 8 and flange 9, as no turning movement is imparted to said nut.

Having now described my invention, what I desire to secure by Letters Patent is—

The combination with a hydraulic cylinder having a nozzle thereon, with a passage leading through said nozzle, and an annular recess in said nozzle around said passage, the inner or bottom wall of said recess being corrugated and constituting a seat for a packing-ring, of an externally-screw-threaded pipe, having a roughened or corrugated end, a flange tapped on said pipe having a narrow contracted hub which extends out toward the roughened end of said pipe and is itself roughened or corrugated, the said pipe and the hub of said flange fitting within said recess, with the roughened or corrugated ends thereof engaging the packing-ring therein, bolts extending through open slots in said nozzle and in said flange, and nuts upon the ends of said bolts, as and for the purpose set forth.

In testimony whereof I have hereunto set my hand in presence of two subscribing witnesses.

JOHN SHEPHERD McDONALD.

Witnesses:
H. P. LAERATUS,
I. J. FORD.